United States Patent Office 3,519,449
Patented July 7, 1970

3,519,449
CEMENTITIOUS COMPOSITIONS HAVING INHIBITED SHRINKAGE AND METHOD FOR PRODUCING SAME
Henry Nash Babcock, Old Greenwich, Conn., assignor to U.S. Grout Corporation, Old Greenwich, Conn., a corporation of Connecticut
No Drawing. Filed May 22, 1967, Ser. No. 640,408
Int. Cl. C04b 7/02, 7/12
U.S. Cl. 106—89               11 Claims

ABSTRACT OF THE DISCLOSURE

The shrinkage of aqueous hydraulic cement mixtures is eliminated by incorporating therein a fluid coke with a controlled amount of moisture less than about 3% by weight. The amount of fluid coke that may be used to eliminate the shrinkage is less than 10% based on the weight of the cement in the mixture.

BACKGROUND OF THE INVENTION

Field of the invention

This invention relates to improvements in aqueous hydraulic cement mixtures such as concrete, mortar, grout and products made from them, architectural stone, concrete block, terrazzo, concrete pipe, asbesto-cement, and the like. More particularly, it relates to an improved method and means for inhibiting shrinkage of such mixtures during setting and early hardening.

The term "hydraulic cement" as used herein, is intended to include any cement which has the characteristic of hardening under water, e.g., Portland cement, blends of Portland cement and natural cement, air-entraining Portland cement, pozzolanic cements, slag cement, aluminous cement, masonry cement, oil well cement, white Portland cement, colored cement, anti-bacteria cement, waterproofed cement, hydraulic lime, a mixture of Portland cement and blast-furnace cement, and like materials.

The term "concrete" is used to designate a mixture of hydraulic cement, aggregate and water, which sets to form a hard mass. Concrete may contain either mineral or nonmineral aggregate, including naturally occurring materials, for instance, sand and gravel or quarried rock, or manufactured aggregate such as expanded shale, clay, or the like.

The term "mortar" is used herein to designate a mixture of hydraulic cement, fine aggregate and water, and the term "grout" designates a mixture of hydraulic cement and water, and sometimes fine sands. Grouts normally have higher fluidity than mortars and can be pumped through pipe lines and forced into small spaces, for instance, into voids or cracks or porous concrete, or into spaces between preplaced aggregate.

Description of the prior art

It has previously been suggested to include in aqueous hydraulic cement mixtures various expansion agents which will cause the concrete to expand during setting and early hardening. They are generally admixtures which may be interground or added at the mixing during the preparation of the cement mixture. Perhaps, the most commonly known expansion agents are aluminum powder and iron filings.

Metallic aluminum powder, when added to a concrete mix, causes the liberation of hydrogen gas within the concrete mass. The rate at which this gas is liberated is a function of the powder used, the particle size of the powder and the composition of the cement, particularly the alkali content. To prepare a non-shrinking concrete, a careful balancing of the amount of the aluminum to be used, hence the amount of the hydrogen to be released, with the anticipated shrinkage of the mass is required, and very careful control at all stages of concrete preparation is essential to yield the desired result. The use of aluminum powder to prevent shrinkage is, therefore, impractical under field conditions that require accurately weighing a very small amount of the metal by, most likely, unskilled laborers.

Iron filings have been used as an admixture to a Portland cement grout. Minor expansion due to oxidation follows after the grout has set, to a sufficient extent, at least, to offset the natural shrinkage inherent in the concrete grout. The use of iron filings, however, has many shortcomings. Chiefly among them is the lack of control due to the continuing oxidation of the iron long after the desired effect has been achieved which is particularly true if the concrete involved is directly exposed to outside weather conditions. Furthermore, using iron filings, temporary shrinkage occurs before sufficient rust can be formed to initiate the internal expansion and to offset the shrinkage.

More recently, fluid coke has been found to be effective for eliminating the shrinkage of aqueous hydraulic cement mixtures which represents a notable advance in the art. Heretofore, a relatively large amount of fluid coke, generally over 10% by weight of the cement, had to be used in order to achieve the desirable non-shrinking result. The requirement for a large volume of fluid coke in a non-shrinking cementitious system not only detracts from the appearance of the final products, due to the black pigmentation effect of the coke, but also the high cost resulting from the large amount of fluid coke additive renders the cement mixture economically unattractive for many commercial applications despite the many inherent advantages in a non-shrinking cementitious system. The relatively large amount of fluid coke that has to be incorporated in the cement mixture also presents material handling problems. The cement industry is equipped with material handling equipment with capacities based on a fixed weight basis, e.g., 94 pounds per sack and 376 pounds per barrel, etc., and is not readily adapted to operate on a new weight basis in excess of 10% without substantially changing the requirements and specifications of construction and other cement-using industries. The requirement for changing the material handling procedures, hence some of the equipment, may indeed be a major obstacle for the commercial acceptance of the non-shrinkage cementitious system.

SUMMARY OF THE INVENTION

I have now discovered that the amount of fluid coke required to eliminate the shrinkage of the concrete mass can be drastically reduced if the moisture content of the fluid coke is carefully controlled. According to the present invention, the shrinkage of an aqueous hydraulic cement mixture during setting and early hardening can be effectively inhibited by incorporating in the cement mixture less than 10% by weight, based on the cement in the mixture, of an admixture containing essentially fluid coke having an absolute moisture content less than 3% by weight.

The resultant aqueous hydraulic cement mixture of the present invention has better workability, e.g., it requires 5% to 10% less water, and the product prepared therefrom has greater strength than a comparable prior art fluid coke cementitious system. Because of the better workability and higher strength of the product, the cement mixture of this invention requires essentially less cement. Furthermore, by carefully controlling the moisture content in the fluid coke, the amount of expansion and contraction of a cementitious system can be much more effectively regulated by the method of this invention. The product prepared from the cement mixture of this invention shows remarkable salt water freeze-thaw resistance, and superior bonding and pull-out strengths. These unique properties in combination with the non-shrinking characterisic and yet without the inherent disadvantages of the prior art fluid coke-cementitious system render the cementitious system of this invention particularly attractive to construction and other related cement-using industries.

DESCRIPTION OF THE PREFERRED EMBODIMENTS

The fluid coke suitable for the present invention is a by-product of the fluid coking process for the thermal conversion of heavy hydrocarbon oils to lighter fractions. The fluid coke part of the process generally uses a fluidized bed reactor in combination with a burner vessel. The seed coke which is used as a catalyst in the fluidized bed reactor is initially heated in the burner vessel and is then fed into the reactor where the coke comes in contact with the raw preheated feed stock. The feed stock, upon contact with the coke particles, is partially cracked and the lighter fractions are flashed off. Additional coke is formed both as seed coke and in the growth of the heated coke particles coming from the burner vessel. The new coke is deposited on the seed coke in onion-like uniform layers. The excess coke thus formed in the reactor is tapped off and quenched. The fluid coke recovered is in a hard spherical form. Screen analysis of one sample was found to be:

|  | Percent |
| --- | --- |
| Coarser than 30 mesh | 1.2 |
| Passed through 30 mesh retained on 50 mesh | 86.1 |
| Passed through 50 mesh retained on 100 mesh | 7.8 |
| Passed through 100 mesh | 5.2 |

The chemical analysis of the coke generally shows about 90% carbon but the ash in crude feed stock will, of course, determine the chemical analysis of the ash of the coke, so wide variations are to be expected. The ash content, however, is very low and usually is less than about 0.5%.

The coke produced in the fluid coking process is normally stockpiled in open space and is shipped to the coke users by rail in hopper cars. As a result of the exposed storage, the moisture content of the coke runs approximately 5% by weight and generally fluctuates in the range of 3% to 7% depending on the local weather conditions when the coke is exposed. Under certain conditions of high humidity or excess rain, the moisture content may exceed the upper limit of 7% by weight. Even at this high moisture content, however, the coke is free flowing and dry to the touch.

To practice the present invention the fluid coke is dried to eliminate substantially all the water contained therein. Advantageously, the fluid coke is dried in a suitable drier such as a rotary kiln at a temperature preferably above 250° F. and for a period sufficient to drive-out substantially all the moisture. The drying temperature, of course, should not be so high as to cause fusion or combustion of the coke particles. After essentially all the moisture is removed, it is important that the resultant dried fluid coke is allowed to cool in dry air for a period sufficiently long thereby allowing the dried coke particles to absorb air and to establish essentially an equilibrium with the ambient conditions. It has been found that the expansion activity of the fluid coke when used immediately after it is dried is drastically reduced as compared with the fluid coke which is allowed to cool to ambient temperature prior to its application as an admixture in the cementitious system according to the present invention.

When cooling the dried fluid coke under normal low humidity conditions, e.g., 70°–80° F. and 10%–30% relative humidity, the coke regains less than about 1% by weight of volatilizable substance which is predominately air and possibly a small amount of water. It is, therefore, not necessary to take special precaution for cooling the dried fluid coke under normal drying-plant conditions where the ambient humidity is reasonably low. However, in hot and humid conditions, special precaution must be taken during the cooling of the fluid coke. In the laboratory experiments, it was found that the amount of moisture that can be reabsorbed by dried fluid coke during cooling can exceed 9% by weight for a 24-hour period under conditions near 100% relative humidity and at about 80° F. Under these, or even severe conditions, it is advantageous to cool the dried fluid coke in a space wherein the humidity is extremely low or readily controllable so that the resultant moisture content of the fluid coke is less than 3% and preferably less than about 1% by weight.

The fluid coke after the drying treatment is now ready to be used as an admixture for any cementitious system for inhibiting shrinkage thereof. The fluid coke is extremly active and will pervent shrinkage as soon as the cement mixture is mixed with water. The expansion activity will continue for a period to offset the shrinkage of the concrete mass due to setting and evaporation of water.

The amount of the admixture of this invention to be used depends on the shrinkage characteristics of the particular cementitious system, and also to a large extent, the amount of evaporation taking place. In general, the amount of fluid coke admixture of this invention required for controlling the shrinkage of a cementitious system setting with a "normal amount of evaporation" is less than 10% by weight of the cement provided, of course, that the moisture content of the coke is below about 3% by weight. The term "normal amount of evaporation" stated hereinabove refers to the amount of water evaporated at the first 3½ hours during setting and early hardening of the concrete mass at ambient conditions of 70°–80° F. and 10%–30% relative humidity. The amount of water evaporated under laboratory conditions stated above is less than 0.5% of the total weight of the aqueous hydraulic mixture. In actual practice, the amount of fluid coke used may be much less than 10% if the moisture content of the fluid coke is controlled to below the preferred range of 1%.

Under "no evaporation" condition, which is recommended for setting almost all types of cement mixtures but is seldom practiced or realized in the actual field conditions, further reduction of the amount of admixture to be used can be realized. (In the laboratory, the "no evaporation" condition is achieved by setting the cement mixture under a thin layer of water.) Thus, in a cementitious system of the following composition:

|  | Grams |
| --- | --- |
| Type 1 cement | 146 |
| Sand | 293 |
| Water | 50 | the amount of dried fluid coke which contains 0.89% of volatilizable substance (possibly predominately air) required to eliminate shrinkage is about 2% by weight of the cement.

In carrying out the method of this invention, the proper amount of dried fluid coke admixture may be added to and mixed with cement or any type of cement mixture at any time prior to or during the addition of water to form aqueous cement mixtures. For example, in preparing grout or mortar, the fluid coke may be mixed with cement or cement and fine aggregates to form a dry cement mixture which is subsequently mixed with the desired amount of water to form grout or mortar. Similarly, in preparing ready-mixed concrete, the fluid coke may be mixed with the cement and aggregates to form a dry mixture which is then used to form the ready-mixed concrete either in a stationary or in a truck mixer. On the other hand, it may be advantageous to mix all the ingredients, including the fluid coke admixture in the stationary and/or in the truck mixer to form the ready-mixed concrete.

Since the amount of fluid coke to be used in any cementitious system can be best calculated based on the amount of cement in the system, it is advantageous to incorporate the fluid coke directly in the cement prior to its shipment to the user. Adding fluid coke to the cement directly in the latter's manufacturing plant has the added advantage of utilizing some of its equipment and waste heat for drying the fluid coke.

It is interesting to note that, although the cement is highly hygroscopic, little or no transfer of moisture between the coke and the cement was observed in laboratory experiment. In other words, the performance of fluid coke with high moisture content will not be improved to a notable extent by mixing it with cement unless the coke is previously dried.

Further to illustrate this invention, specific examples are described hereinbelow. In these examples, the performance of the fluid coke admixture was judged by the expansion and contraction of the cementitious system as soon as it was mixed with water and cast in a cylindrical mold with approximately 10% of exposed surface. The expansion and contraction of the cast was determined by the vertical movement of the top surface. For the purpose of higher accuracy, a light test was used to measure the movement of the top surface. The test consists of using a focused light beam to project a shadow of the top surface onto a screen equipped with a vertical graduation. The magnification is 72 times. The movement of the top surface on the screen is recorded in every 10 to 20 minutes for each cast until final set which usually takes about 3 to 4 hours.

A thin layer of water was added to the mold for cast setting under "no evaporation" condition. To facilitate the detection of the movement of the top surface, a marble was placed on top of the surface and the expansion or contraction of the cast was determined by the movement of the apex of the shadow projected on the screen.

EXAMPLE I

In this example, various cement-sand mixtures with different amounts of fluid coke were cast in cylindrical molds measured 2 inches in diameter by 3⅞ inches in height. The casts were allowed to set under normal evaporation condition. In the first set of casts, the following aqueous hydraulic cement mixture was used of which only the moisture content of the fluid coke was changed in different casts:

TABLE I

| | Grams |
|---|---|
| Type 1 cement | 146 |
| Sand | 293 |
| Fluid coke (15% of cement) | 21.9 |
| Water (3.8 gallons per 94 lbs. sack) | 49 |

The fluid coke used was dried in an oven at 250° F. overnight and thereafter cooled in dry air until it reached an ambient temperature of about 75° F. The difference in weight between right after drying and subsequent to cooling was 0.89% which represents the amount of air or water regained by the fluid coke. For the purpose of convenience, this fluid coke is identified hereinafter as "Standard." Samples of fluid coke with different moisture content were prepared from the Standard by adding thereto 1%, 2%, 3%, and 4% by weight of water with care to avoid water evaporation. When the water was added to the Standard, slight lumpiness was observed. This condition, however, disappeared overnight and the resultant fluid coke was free flowing.

Six casts were made using mixtures prepared according to the proportions set forth in Table I using in each cast samples of fluid coke with a different moisture content and in one cast with no fluid coke for the purpose of comparison. The results of light test for determining the expansion and contraction of the casts are tabulated below:

TABLE II

| Cast | Amount of moisture added to "Standard," percent | Light test growth after 4 hours (inches) |
|---|---|---|
| A | 0 | +3¼ |
| B | 1 | +2¾ |
| C | 2 | +1¼ |
| D | 3 | −1 |
| E | 4 | −1¼ |
| F | No fluid coke | −2⅜ |

The results of the light test show that growth or expansion can be realized with fluid coke containing 2% added moisture or computed on an absolute scale, less than 2.89% moisture. It is interesting to note that the difference of 1% of moisture between casts C and D causes a change of 2½ inches in the test scale whereas the difference of 1% between casts B and C or D and E leads to changes of 1¼ and ¼ inches, respectively.

In the second set of casts, mortar with proportions set forth in Table I was prepared in a manner similar to the first set and with the exception that the amount of fluid coke used was 10% by weight of the cement. Light test of the casts show that shrinkage was eliminated when the moisture content in the fluid coke was below 3%.

In the third set of casts, mortar with the following proportions was prepared in a manner similar to the first set:

TABLE III

Type 1 cement—8.1 ounce (230 grams)
Sand—16.3 ounce
Fluid coke (8% cement)—18.4 grams
Water (3.8 gallons per 94 lbs. sack)—77.5 grams Light test shows shrinkage was prevented with fluid coke containing less than 2% of moisture.

In still another set of casts using 6% by weight of cement in a manner similar to the first set, light test shows that shrinkage was prevented with fluid coke containing less than 1% of moisture.

EXAMPLE II

In this example, the "no evaporation" condition was used for setting the mortar. The mortar used has the following composition:

| | Grams |
|---|---|
| Type 1 cement | 146 |
| Sand | 293 |
| Water | 50 |

The fluid coke added thereto has less than 0.89% by weight of moisture. The results of the light test on various casts using different amounts of fluid coke is tabulated below:

TABLE IV

| Percent coke: | Volume change after 3 hours, inches |
|---|---|
| 0 | 1⅜ |
| 1 | −¾ |
| 2 | No shrinkage |
| 3 | +¾ |

Although the above examples used mortar, it is understood that the fluid coke of this invention is equally effective for eliminating shrinkage in any cementitious system identified hereinabove.

I claim:
1. A method for inhibiting the shrinkage of an aqueous hydraulic cement mixture during setting and early hardening which comprises incorporating in the cement mixture an effective amount less than 10% by weight, based on the cement in the mixture, of an admixture consisting essentially of fluid coke having an absolute moisture content less than 3%.

2. A method according to claim 1 wherein the admixture is dispersed in the hydraulic cement prior to mixing the hydraulic cement with water.

3. A method according to claim 1 wherein the admixture is incorporated in the aqueous hydraulic cement mixture at the point of mixing the hydraulic cement with water.

4. A method according to claim 1 wherein the moisture content in the fluid coke is less than 1%.

5. A method according to claim 4 and further characterized in that the fluid coke is pretreated to remove substantially all the moisture therein and that the thus treated fluid coke is allowed to cool in dry air for a period sufficient to establish substantial equilibrium with the ambient conditions prior to its incorporation in the cement mixture.

6. A method for inhibiting the shrinkage of an aqueous hydraulic cement mixture during setting and early hardening which comprises incorporating in the cement mixture a small percentage of an admixture consisting essentially of fluid coke having an absolute moisture content less than 3%, the amount of the admixture being sufficient to eliminate the shrinkage due to the chemical action of the cement and the evaporation of water during setting and early hardening.

7. A method according to claim 6 wherein said admixture is pretreated at a temperature above about 250° F. for a period sufficient to remove substantially all the moisture therein and thereafter allowing the thus treated fluid coke to cool in dry air for a period sufficient to establish a substantially equilibrium condition with the ambient conditions and to regain less than 1% by weight of moisture prior to its incorporation in the cement mixture.

8. A cementitious composition which when mixed with water is capable of setting into a hard mass with inhibited shrinkage during setting and early hardening, said composition comprising a hydraulic cement mixture and an admixture consisting essentially of fluid coke having a moisture content less than 3%, the amount of the admixture being an effective amount less than 10% by weight of the cement in the hydraulic cement mixture.

9. A cementitious composition of claim 8 wherein the hydraulic cement mixture comprises Portland cement and concrete aggregate, and the amount of the admixture is in the range between 2% and 10%.

10. A cementitious composition of claim 8 wherein the hydraulic cement mixture comprises Portland cement and concrete aggregate, and the admixture has particles with sizes predominately finer than 30 mesh.

11. A cementitious composition of claim 10 wherein the fluid coke has a moisture content less than about 1%.

References Cited

UNITED STATES PATENTS

| | | | |
|---|---|---|---|
| 169,218 | 8/1875 | Whittemore | 106—97 |
| 1,519,286 | 12/1924 | Winkler | 106—97 |
| 1,772,149 | 8/1930 | Jolitz | 106—95 |
| 3,234,035 | 2/1966 | Small et al. | 106—89 |
| 3,376,146 | 4/1968 | Mitchell | 106—97 |
| 3,414,504 | 12/1968 | Oldweiler | 208—53 |

TOBIAS E. LEVOW, Primary Examiner

W. T. SCOTT, Assistant Examiner

U.S. Cl. X.R.

106—97, 314